(12) United States Patent
Kundu et al.

(10) Patent No.: US 11,930,023 B2
(45) Date of Patent: Mar. 12, 2024

(54) DEEP LEARNING-BASED SIMILARITY EVALUATION IN DECENTRALIZED IDENTITY GRAPHS

(71) Applicant: International Business Machines Corporation, Armonk, NY (US)

(72) Inventors: Ashish Kundu, Elmsford, NY (US); Arjun Natarajan, Old Tappan, NJ (US); Kapil Kumar Singh, Cary, NC (US); Joshua F. Payne, San Antonio, TX (US)

(73) Assignee: International Business Machines Corporation, Armonk, NY (US)

( * ) Notice: Subject to any disclaimer, the term of this patent is extended or adjusted under 35 U.S.C. 154(b) by 1140 days.

(21) Appl. No.: 16/409,212

(22) Filed: May 10, 2019

(65) Prior Publication Data
US 2020/0358796 A1 Nov. 12, 2020

(51) Int. Cl.
*G06F 16/901* (2019.01)
*G06N 3/08* (2023.01)
*H04L 9/40* (2022.01)

(52) U.S. Cl.
CPC ...... *H04L 63/1425* (2013.01); *G06F 16/9024* (2019.01); *G06N 3/08* (2013.01)

(58) Field of Classification Search
CPC . H04L 63/1425; H04L 63/14; G06F 16/9024; G06N 3/08; G06N 3/0454; G06N 3/084
See application file for complete search history.

(56) References Cited

U.S. PATENT DOCUMENTS

| | | | | |
|---|---|---|---|---|
| 6,112,186 | A * | 8/2000 | Bergh | G06F 16/335 705/14.66 |
| 6,546,390 | B1 * | 4/2003 | Pollack | G06Q 10/107 |
| 7,793,835 | B1 | 9/2010 | Coggeshall et al. | |
| 9,798,815 | B1 * | 10/2017 | Buyukkokten | G06F 16/337 |
| 10,257,181 | B1 * | 4/2019 | Sherif | G06F 21/316 |
| 10,986,123 | B2 * | 4/2021 | Wardman | H04L 63/102 |
| 11,240,641 | B1 * | 2/2022 | Eberhardt | H04W 8/18 |

(Continued)

FOREIGN PATENT DOCUMENTS

CA 2407674 A1 * 4/2001

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Lynn D Feild
*Assistant Examiner* — Abdullah Almamun
(74) *Attorney, Agent, or Firm* — Stephen R. Yoder

(57) ABSTRACT

A deep-learning based method evaluates similarities of entities in decentralized identity graphs. One or more processors represent a first identity profile as a first identity graph and a second identity profile as a second identity graph. The processor(s) compare the first identity graph to the second identity graph, which are decentralized identity graphs from different identity networks, in order to determine a similarity score between the first identity profile and the second identity profile. The processor(s) then implement a security action based on the similarity score.

17 Claims, 12 Drawing Sheets

(56) References Cited

U.S. PATENT DOCUMENTS

| | | | | |
|---|---|---|---|---|
| 2001/0054153 | A1* | 12/2001 | Wheeler | G06F 21/55 713/185 |
| 2002/0087632 | A1* | 7/2002 | Keskar | H04L 69/329 709/204 |
| 2002/0099649 | A1 | 7/2002 | Lee et al. | |
| 2004/0225520 | A1 | 11/2004 | Aoki et al. | |
| 2005/0187956 | A1* | 8/2005 | Sylvester | G06Q 10/10 |
| 2010/0274815 | A1* | 10/2010 | Vanasco | G06Q 30/02 707/798 |
| 2013/0124176 | A1 | 5/2013 | Fox et al. | |
| 2015/0134745 | A1* | 5/2015 | Posse | G06F 16/24578 709/204 |
| 2016/0292643 | A1* | 10/2016 | Rodriguez | G06Q 10/1053 |
| 2017/0293836 | A1* | 10/2017 | Li | G06N 3/0445 |
| 2017/0351769 | A1* | 12/2017 | Karakas | G06F 16/9577 |
| 2018/0089301 | A1* | 3/2018 | Kafai | G06F 16/285 |
| 2018/0108066 | A1 | 4/2018 | Kale et al. | |
| 2018/0139227 | A1* | 5/2018 | Martin | H04L 63/1433 |
| 2018/0158163 | A1* | 6/2018 | Zhang | G06Q 50/2057 |
| 2018/0253694 | A1* | 9/2018 | Kenthapadi | G06Q 10/1053 |
| 2019/0147071 | A1* | 5/2019 | Shapiro | G06F 18/2135 707/736 |
| 2019/0156206 | A1* | 5/2019 | Graham | G06N 3/0454 |
| 2019/0188561 | A1* | 6/2019 | Tang | G06N 3/08 |
| 2020/0004835 | A1* | 1/2020 | Ramanath | G06F 16/248 |
| 2020/0125647 | A1* | 4/2020 | Mintz | G06V 40/174 |
| 2020/0125967 | A1* | 4/2020 | Seo | G06N 20/00 |
| 2020/0175361 | A1* | 6/2020 | Che | G06N 5/04 |
| 2023/0134742 | A1* | 5/2023 | Li | G06F 17/16 726/22 |

OTHER PUBLICATIONS

J. Li et al., "A Framework of Identity Resolution: Evaluating Identity Attributes and Matching Algorithms", Springer, Security Informatics, (2015) 4:6, pp. 1-12.

S. Ktena et al., "Distance Metric Learning Using Graph Convolutional Networks: Application to Functional Brain Networks", https://arxiv.org/pdf/1703.02161.pdf, Jun. 14, 2017, pp. 1-8.

F. Scarselli et al., "The Graph Neural Network Model", 2009, IEEE Transations on Neural Networks, vol. 20, No. 1, pp. 61-80.

M. Defferrard et al., "Convolutional Neural Networks on Graphs With Fast Localized Spectral Filtering", 2016, 30th Conference on Neural Information Processing Systems (NIPS 2016), Barcelona, Spain, pp. 1-9.

Q. Xu et al., "Collective Vertex Classification Using Recursive Neural Network", Arxiv:1701.06751V1, Jan. 24, 2017, pp. 1-7.

Q. Xu et al., "Attentive Graph-Based Recursive Neural Network for Collective Vertex Classification", ACM, 2017, CIKM'17, pp. 1-4.

B. Perozzi et al., "Deepwalk: Online Learning of Social Representations", Arxiv:1403.6652V2, Jun. 27, 2014, KDD'14, pp. 1-10.

H. Chen et al., "HARP: Hierarchical Representation Learning for Networks", AAAI, The Thirty-Second AAAI Conference on Artificial Intelligence, 2018, pp. 2127-2134.

A. Grover et al., "NODE2VEC: Scalable Feature Learning for Networks", ACM, KDD'16, 2016, pp. 1-10.

R. Wang et al., "Deep & Cross Network for Ad Click Predictions", Arxiv:1708.05123V1, Aug. 17, 2017, pp. 1-7.

W. Hamilton et al., "Inductive Representation Learning on Large Graphs", 31st Conference on Neural Information Processing Systems (NIPS 2017), Long Beach, CA, USA, 2017, pp. 1-19.

S. Hochreiter et al., "Long Short-Term Memory", Neural Computation 9(8): 1735-1780, 1997.

R. Rossi et al., "Deep Feature Learning for Graphs", Arxiv:1704.08829V2, Oct. 16, 2017, pp. 1-11.

S. Bai et al., "An Empirical Evaluation of Generic Convolutional and Recurrent Networks for Sequence Modeling", Arxiv:1803.01271V2, Apr. 19, 2018, pp. 1-14.

J. Leskovec et al., "SNAP: Stanford Large Network Dataset Collection", http://snap.stanford.edu/data/index.html, Retrieved May 10, 2019, pp. 1-5.

Anonymous, "Press Release: Identity Theft Protection Services Market 2018 Global Trend, Segmentation and Opportunities Forecast to 2023", http://www.digitaljournal.com/pr/3835663, Retrieved May 10, 2019, pp. 1-4.

* cited by examiner

DEEP LEARNING-BASED SIMILARITY EVALUATION IN DECENTRALIZED IDENTITY GRAPHS

BACKGROUND

The present invention relates to the field of identity similarity detection, and specifically to identifying similar identities using identity graphs.

SUMMARY

In an embodiment of the present invention, a deep-learning based method evaluates similarities of entities in decentralized identity graphs. One or more processors represent a first identity profile as a first identity graph and a second identity profile as a second identity graph. The processor(s) compare the first identity graph to the second identity graph, which are decentralized identity graphs from one or more identity networks, in order to determine a similarity score between the first identity profile and the second identity profile. Thus, the similarity score is across multiple identity profiles. The processor(s) then implement a security action based on the similarity score.

In one or more embodiments, the method(s) described herein are performed by an execution of a computer program product and/or a computer system.

DETAILED DESCRIPTION

Figure 1:
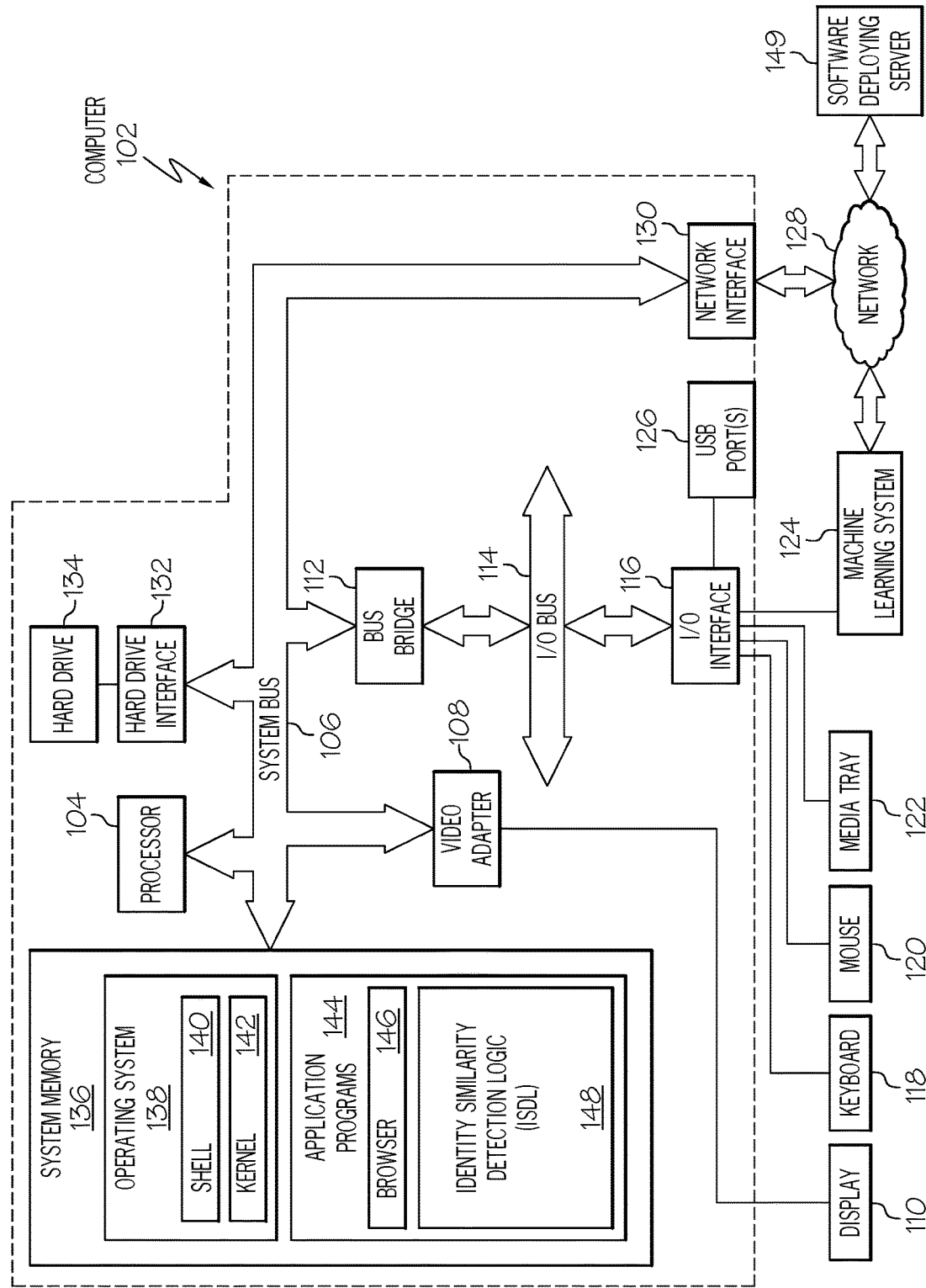
FIG. 1 depicts an exemplary system and network in which the present invention is implemented in one or more embodiments of the present invention.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that is utilized by and/or implemented in one or more embodiments of the present invention. Note that some or all of the exemplary architecture, including both depicted hardware and software, shown for and within computer 102 may be utilized by software deploying server 150 and/or machine learning system 124 shown in FIG. 1, identity broker 418 and/or identity requester 420 shown in FIG. 4, and/or one or more of the neurons depicted in FIG. 7.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a machine learning system 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or the machine learning system 124 using a network interface 130 to a network 128. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an Identity Similarity Detection Logic (ISDL) 148. ISDL 148 includes code for implementing the processes described below, including those described in FIGS. 2-10. In one embodiment, computer 102 is able to download ISDL 148 from software deploying server 150, including in an on-demand basis, wherein the code in ISDL 148 is not downloaded until needed for execution. Note further that, in one embodiment of the present invention, software deploying server 150 performs all of the functions associated with the present invention (including execution of ISDL 148), thus freeing computer 102 from having to use its own internal computing resources to execute ISDL 148.

Also connected to (or alternatively, as part of) computer 102 is a machine learning system 124. In exemplary embodiments of the present invention, machine learning system 124 is a graph neural network (see FIGS. 5-6) a deep neural network (see FIG. 7), another type of heuristic artificial intelligence, and/or a combination thereof.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention. For example, and with specific regard to a server as used in one or more embodiments of the present invention, computer 102 is lacking elements such as irrelevant components such as video adapter 108, keyboard 118, etc., but includes elements (not shown) such as graphics processing units, co-processors for various functions (e.g., dedicated to certain arithmetic processes), etc.

As used herein, an identity is defined as a record that includes identification information about a particular entity. An exemplary entity is a person, although the present invention is also applicable for providing an identity of a device, a software program, etc. The terms "identity", "identity profile", "identity file" and "identity record" are used interchangeably herein to denote an "identity". An identity profile is composed of "attributes" (also referred to herein as "characteristics"), which in one or more embodiments of the present invention, are represented as nodes in a graph of the identity profile.

Identity similarity is the distinction of a characteristic or set of characteristics shared by two or more identity profiles or attributes. As these profiles and attributes are part of an identity graph, then that identity similarity is the distinction of a characteristic or set of characteristics shared by two or more nodes or subgraphs in the overall graph.

Enterprises such as banks and healthcare providers prefer to use identities (of customers/users) that have a low similarity with fraudulent identities, and a high similarity with identities that have been verified. That is, such entities prefer to use identities that are unlike identities known to be fraudulent, but rather are similar to, if not exactly the same as, known valid identities.

The use of similar identities provides two benefits to enterprises: security and analysis.

Security: similarity predictions can be used to determine how likely it is that an entity is reusing attributes and profiles maliciously. That is, if profiles for two different entities look exactly alike, then this is just as suspicious as two profiles for a same entity that are vastly different.

Analysis: malicious actors (often referred to as "fraudsters") are currently able to commit fraud using the same assets and patterns in different networks, as well as multiple identities. Likewise, when two profiles are claimed by one member, there should be a logical correlation. Thus, the similarity prediction algorithms described herein are able to identify these behaviors and correlations in a way that is not possible, within a single centralized network, when determining overall confidence levels for all participants.

Similarities between identities can be used to perpetuate and indicate fraud. However, methods of reusing identities are always evolving. Furthermore, multiple similar identities can be reused for fraudulent purposes, and multiple similar attributes can be reused for fraudulent purposes. In addition, patterns in fraudulent identities can be identified in other similar questionable identities for investigation.

The problem is that there is no effective way for a system to compute a similarity score of an identity profile as it relates to others in a network or across multiple networks. That is, how does an attribute in one identity or network affect the similarity score of the identity?

For example, consider the use of a similarity score for confidence deduction. Assume, for exemplary purposes, that Person A and Person B have their own identity profiles, but that Person B is a fraudster. The present invention detects that Person A and Person B are likely sharing some set of attributes, or have similar behaviors. Due to this inference, the confidence score of Person A is lowered (since Person A is so similar to known fraudster Person B) and a security action (e.g., further investigative measures, blocking access to the identity profile for Person A, isolating the computer system that contains the identity profile for Person A, etc.) is taken.

Figure 4:
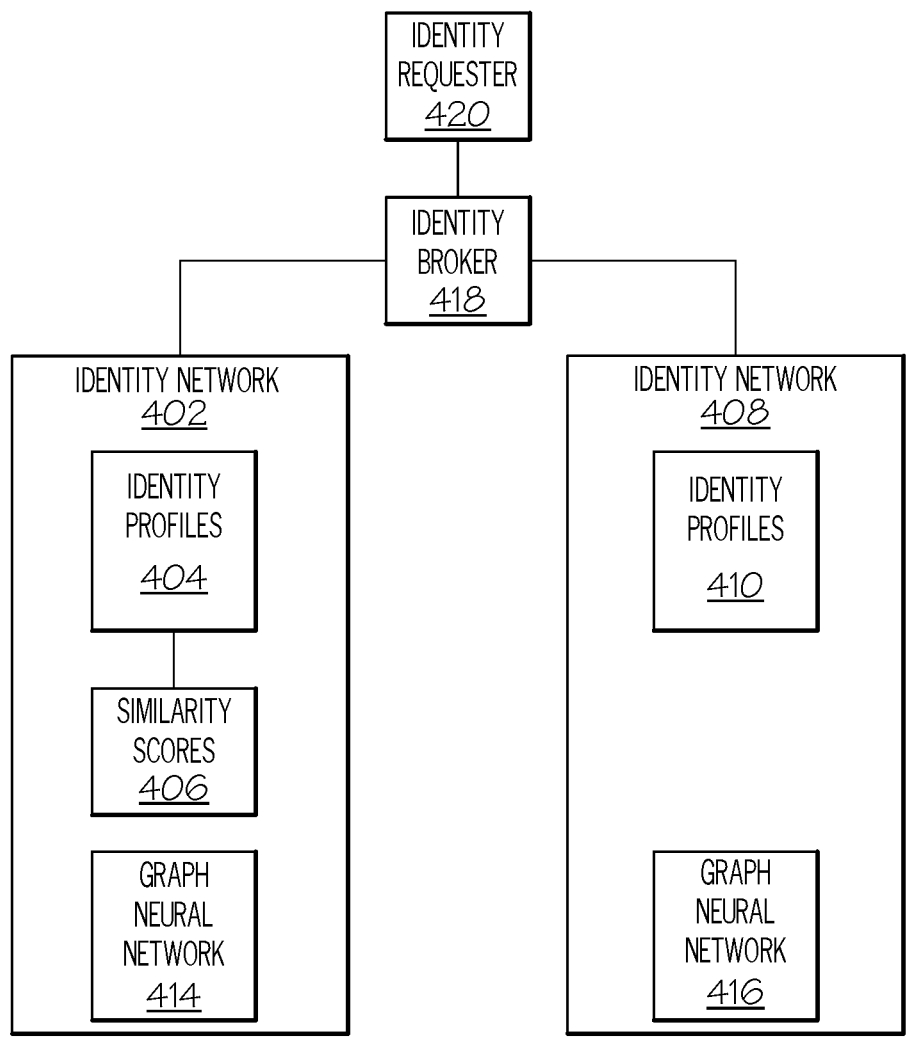
FIG. 4 illustrates additional detail of identity networks shown in FIG. 3.

That is, assume that identity requester 420 shown in FIG. 4 has requested an identity profile for a particular person from identity broker 418. Thus, if identity broker 418 retrieves an identity profile (e.g., from identity profiles 404 in identity network 402) that is very similar to a known fraudulent identity profile (e.g., from identity profiles 404 in identity network 402 and/or from identity profiles 410 in identity network 408), then the identity broker 418 performs a certain security action.

For example and in the embodiment in which the security action is blocking access to the identity profile for Person A, the identity broker 418 blocks identity requester 420 from ever receiving a copy of the identity profile that has now been determined to be fraudulent, based on its similarity to the known fraudulent identity profile.

In the exemplary embodiment in which the security action is isolating the computer system that contains the identity profile for Person A, assume that the newly-discovered fraudulent identity profile (based on its similarity to a known fraudulent identity profile) is within the identity profiles 404 in identity network. Based on this new discovery, the entire identity network 402 is now isolated, by the identity broker 418 and for the identity requester 420, such that no identity profiles from the identity network 402 are allowed to be sent to the identity broker 418, and thus to the identity requester 420. That is, the identity network 402 is now isolated (e.g., any packets from identity network 402 are rejected) from the identity broker 418. This prevents any identity profiles from ever reaching the identity requester 420.

Similarity scores can also be used for confidence building. Assume that Person A and Person B have different identity profiles, but that Person A and Person B are actually a same person. Assume further that this same person claims both profiles through a system such as an identity broker. Thus, when the identity broker checks the validity of this claim, it sees that the identities share similar attributes and behaviors, and thus indicate the likelihood of them belonging to the same person. As such, the verifiers of all attributes of the two identity profiles are combined per attribute, and the overall confidence score is boosted.

Using modern advances in machine learning, the present invention utilizes a new and useful approach to identify similarities in decentralized identity profiles. Such identity profiles (e.g., for entities such as persons or enterprises, etc.) are represented as attributed subgraphs, which are structures that link together different, often disjointed identity networks (maintained by different enterprises such as banks, insurance companies, government agencies, etc.).

One or more embodiments of the present invention uses deep neural networks to embed, or represent, the identity profile or attribute of interest and its interactions with other objects in an identity graph at a given time, and map the changes and interactions (or behaviors), over time of the identity profile or attribute of interest to a similarity score when compared to other identity profiles and attributes.

This provides the capability of actionably using any data or heuristics that a client or network can provide with different deep learning techniques and analytics, and is useful even if only minimal data like a graph structure is available, by using behaviors and relationships between multiple networks to perform strong inferences analysis on identity profiles. The system yields several deliverables that a client can use in their similarity identification stack, depending on the data the client has.

As such, one or more embodiments of the present invention provide an analysis of relationship and behavioral patterns within and between multiple networks for predictive similarity analysis of identity profiles. With a unifying agent for cross-network data share, the present invention employs graph analysis to the benefit to all of the networks involved, encouraging other networks to join, thus increasing the ability to detect identity similarities (and thus fraudulent identity profiles) across the entire system, and to infer connections between reportedly unlinked identity profiles.

Use of graph neural networks and supervised temporal learning for dynamic similarity evaluation affords the ability to analyze identity profiles across multiple networks, which is made more effective with temporal attributes, using deep learning. This way, deep neural networks can identify behaviors and traits in graph topology over time that are similar. Based on training data, the present invention can more effectively: identify pairs of similar members; identify pairs of similar attributes; and/or identify clusters of similar members and/or attributes.

Figure 2:
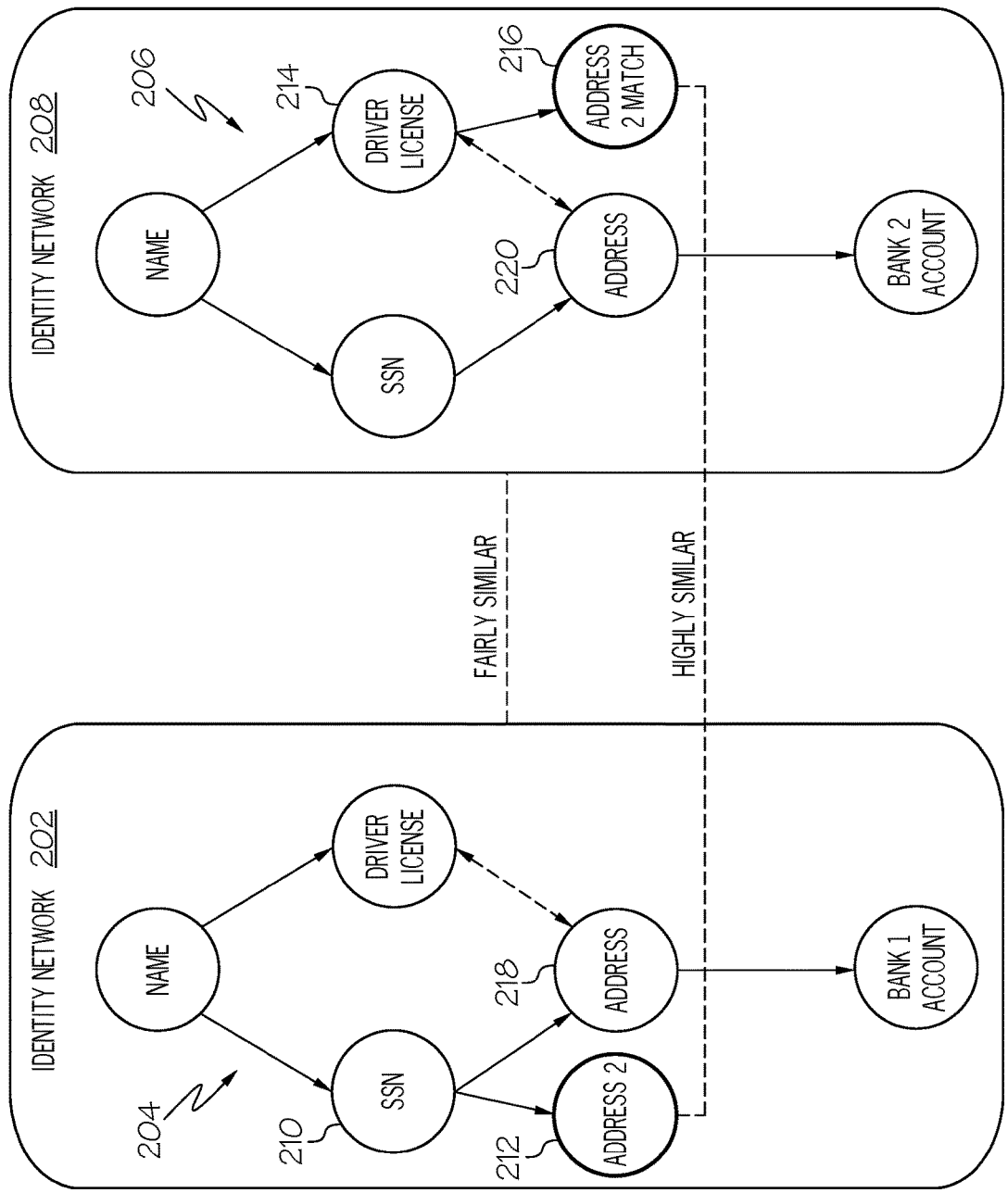
FIG. 2 illustrates two similar identity graphs from two different identity networks in accordance with one or more embodiments of the present invention.

With reference now to FIG. 2, consider identity graph 204 in identity network 202 (i.e., an identity network that provides identity profiles/graphs to requesters) and identity graph 206 in identity network 208 (i.e., a different identity network that also provides identity profiles/graphs to requesters). Since the structure, format, and labels of nodes in the two identity graphs 204 and 206 are similar, then they are considered to be "fairly similar". However, consider now node 212 and node 216. Both node 212 and node 216 contain the same home address for the entity being represented in their respective identity graphs 204 and 206. However, node 212 obtained the home address from the node 210 that includes data that includes a social security number of the entity, while node 216 obtained the home address from the node 214 that includes the driver's license number of the entity. That is, although the home address came from disparate types of nodes, it is identical in both node 212 and node 216. This makes the two identity graphs 204 and 206 highly similar. Thus, if identity graph 204 is later confirmed as being accurate/legitimate, then identity graph 206 is also assumed to be accurate/legitimate.

In one or more embodiments of the present invention, the two identity graphs 204 and 206 are disconnected (independent of one another), such that any similarity is based on independent creations of the two identity graphs 204 and 206. Furthermore, in one or more embodiments of the present invention, the structural properties of the two identity graphs 204 and 206 contribute to the similarity score for the two identity graphs 204 and 206. That is, the relationships and organization between nodes in the two identity graphs 204 and 206 lead to their similarity. For example, the two identity graphs 204 and 206 use the same hierarchy, and thus are deemed to be similar. If, however, the two identity graphs 204 and 206 had different nodes and/or node positions (indicating different relationships, dependencies, etc. among their nodes) when comparing the two identity graphs 204 and 206 to each other, then the two identity graphs 204 and 206 would not be as similar.

Figure 3:
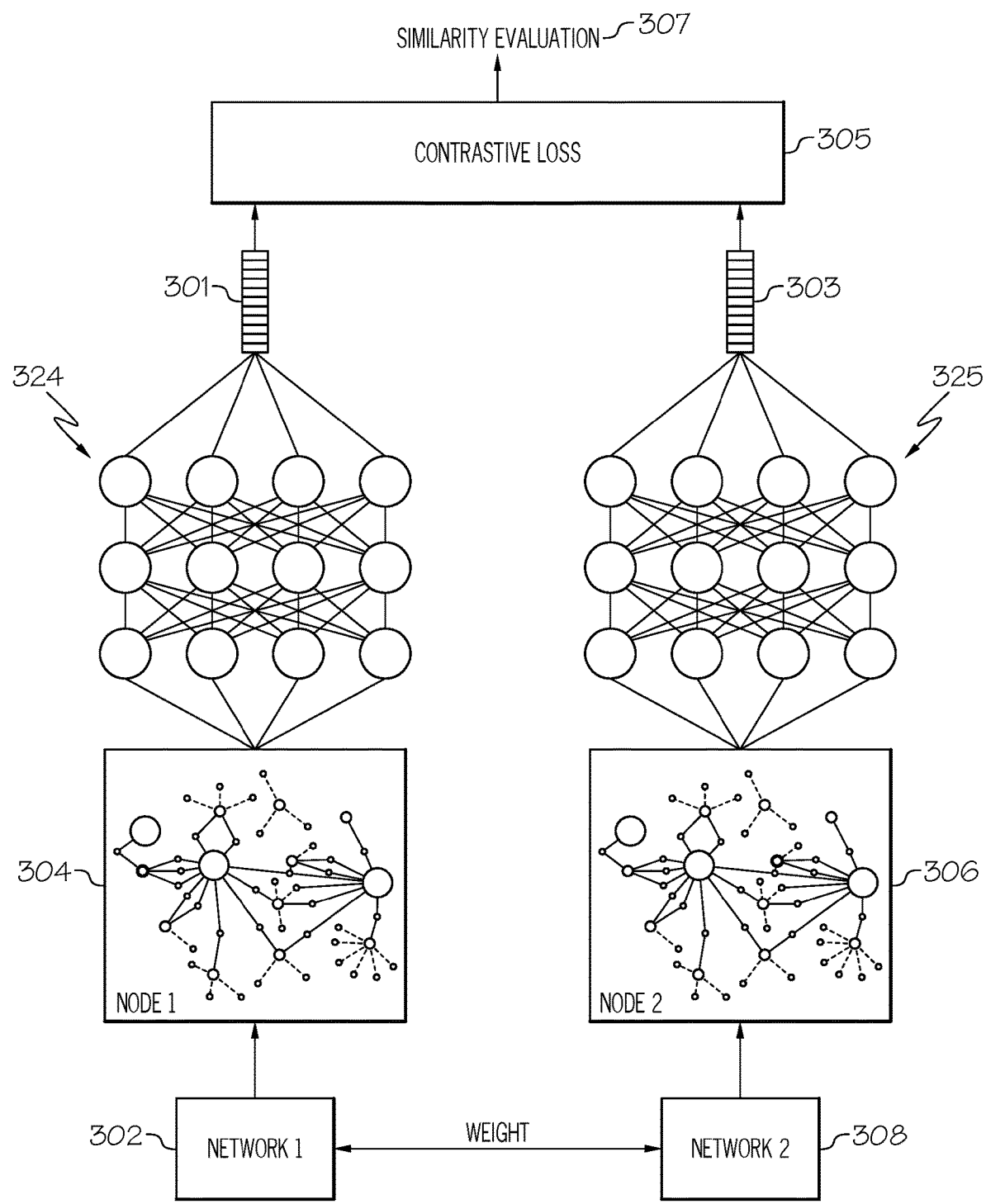
FIG. 3 depicts a high-level overview of evaluating similarities of identities from different identity networks in accordance with one or more embodiments of the present invention.

With reference now to FIG. 3, a high level overview of one or more embodiments of the present invention is presented.

Assume that there are two identity networks, shown as "Network I" (identity network 302, analogous to identity network 202 shown in FIG. 2) and "Network II" (identity network 308, analogous to identity network 208 shown in FIG. 2). As shown in FIG. 3, Network I provides identity graph 304 (analogous to identity graph 204 shown in FIG. 2), and Network II provides identity graph 306 (analogous to identity graph 206 shown in FIG. 2).

Values from nodes (attributes) in identity graph 304 are fed as inputs into a deep neural network 324 (analogous to machine learning system 124 shown in FIG. 1), and values from nodes (attributes) in identity graph 306 are fed as inputs into a deep neural network 325 (also analogous to machine learning system 124 shown in FIG. 1), thus resulting in respective output identity vector 301 and identity vector 303, which describe features of the entities represented by respective identity graphs 304 and 306.

As shown in block 305, a contrastive loss analysis describes the similarities/differences between identity vector 301 and identity vector 303, thus leading to the similarity evaluation 307 that describes how similar the identities represented by identity graphs 304 and 306 are to one another. That is, attributes from identity vector 301 are compared to attributes from identity vector 303. If more than a predetermined percentage of the attributes from identity vector 301 and identity vector 303 match, then a conclusion is reached that identity vector 301 and identity vector 303 describe a same entity. However, if less than a predetermined percentage of the attributes from identity vector 301 and identity vector 303 match, then a conclusion is reached that identity vector 301 and identity vector 303 describe different entities.

In an embodiment of the present invention, in which a contrastive loss analysis or another comparative analysis is performed between identity vectors (e.g., in which attributes are compared for similarities/differences), different identity vectors are normalized according to attribute nomenclature. That is, assume that a first identity vector uses the term "residence" as a name for the field describing where a person lives, while another identity vector uses the term "street address" as the name for the field describing where a person lives. The system, using a lookup table or other correlation logic, recognizes that "residence" and "street address" are the same attribute for the person, and thus these two attributes/fields are compared to one another.

One or more embodiments of the present invention then use the results of the similarity evaluation 307 to determine whether the two identities are trustworthy, are interchangeable, are legitimate, are eligible for release to requesters, etc.

As depicted in FIG. 3, Network I and Network II can be relatively weighted. That is, Network I can have a first weight and Network II can have a higher or lower weight, such that that identity graphs 304 and 306 and their respective identity vectors 301 and 303 will have different weights. For example, assume that Network I provides identity information provided by a user when filling out a school raffle ticket. This information (e.g., the person's address) is likely to have been filled out much less carefully than information (the same person's address) that came from Network II from an application for a passport. As such, if attributes of the person's identity profile found in identity graph 304 do not match the attributes of that person's identity profile found in identity graph 306, the attributes from identity graph 304 are not considered to be significant, and thus the attributes from identity graph 306 are trusted, even though they do not all match those found in the identity graph 304.

With reference now to FIG. 4, identity network 402 and identity network 408 are networks that contain and/or provide identity profiles. For example, identity network 402 could be a network for a bank, which contains identity profiles 404 that contain profile information about its customers (e.g., name, address, bank account number, social security number, etc.). Assume that the identity network 402 has also determined how similar the profiles in the identity profiles 404 are, and stores similarity scores 406 that are associated with one or more of the identity profiles 404. For example, assume that a particular identity profile from identity profiles 404 is exactly the same as one or more identity profiles from identity profiles 410 in identity network 408. As such, an identity score (e.g., having a high value) is stored in the similarity scores 406 for that particular identity profile. Similarly, if another identity profile from identity profiles 404 looks nothing like any of the other identity profiles from identity profiles 410 (and/or alternatively, from identity profiles 404), then that other identity profile is given a very low similarity score.

Figure 5:
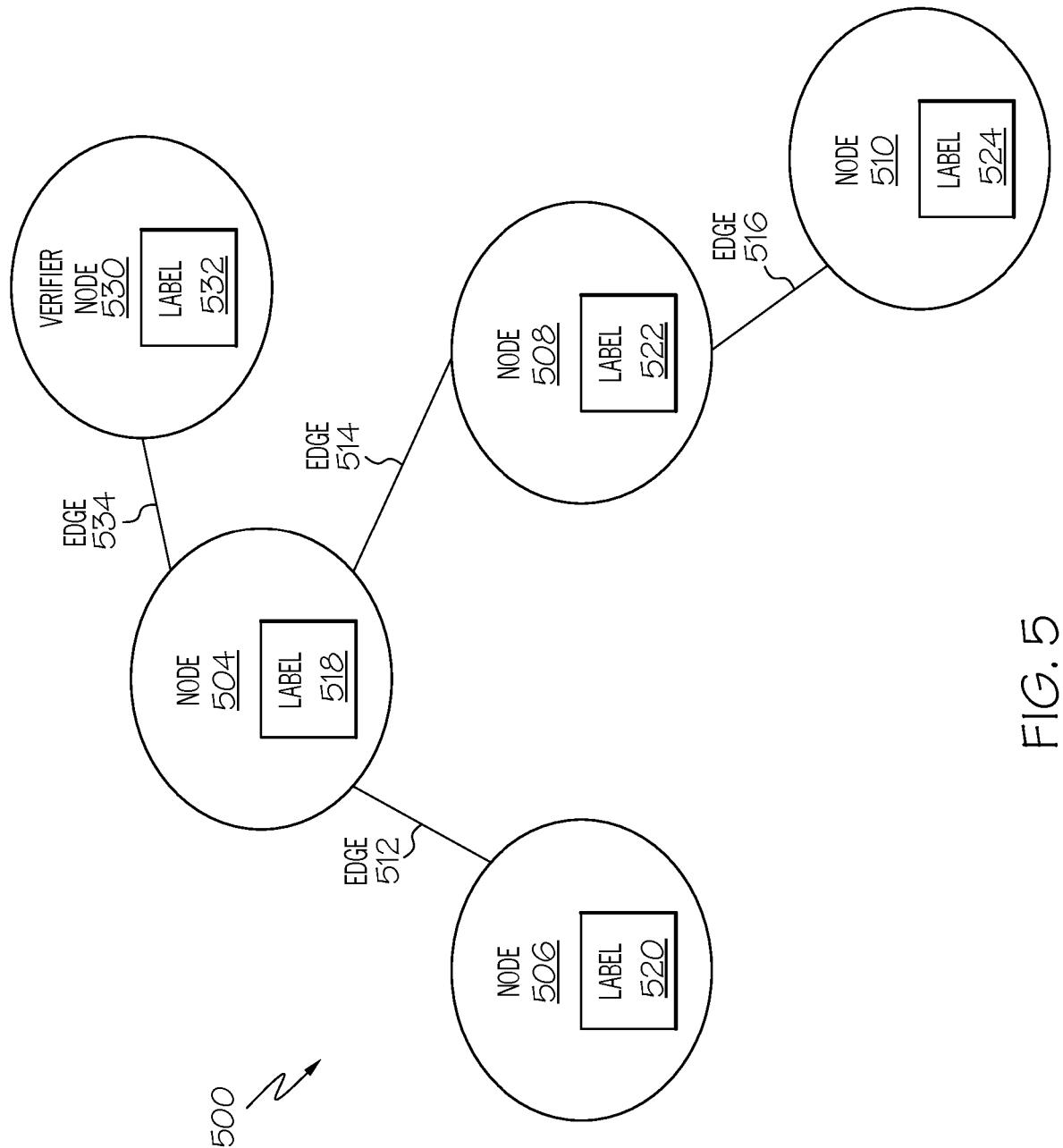
FIG. 5 depicts an exemplary graph neural network (GNN) as utilized in one or more embodiments of the present invention.
Figure 6:
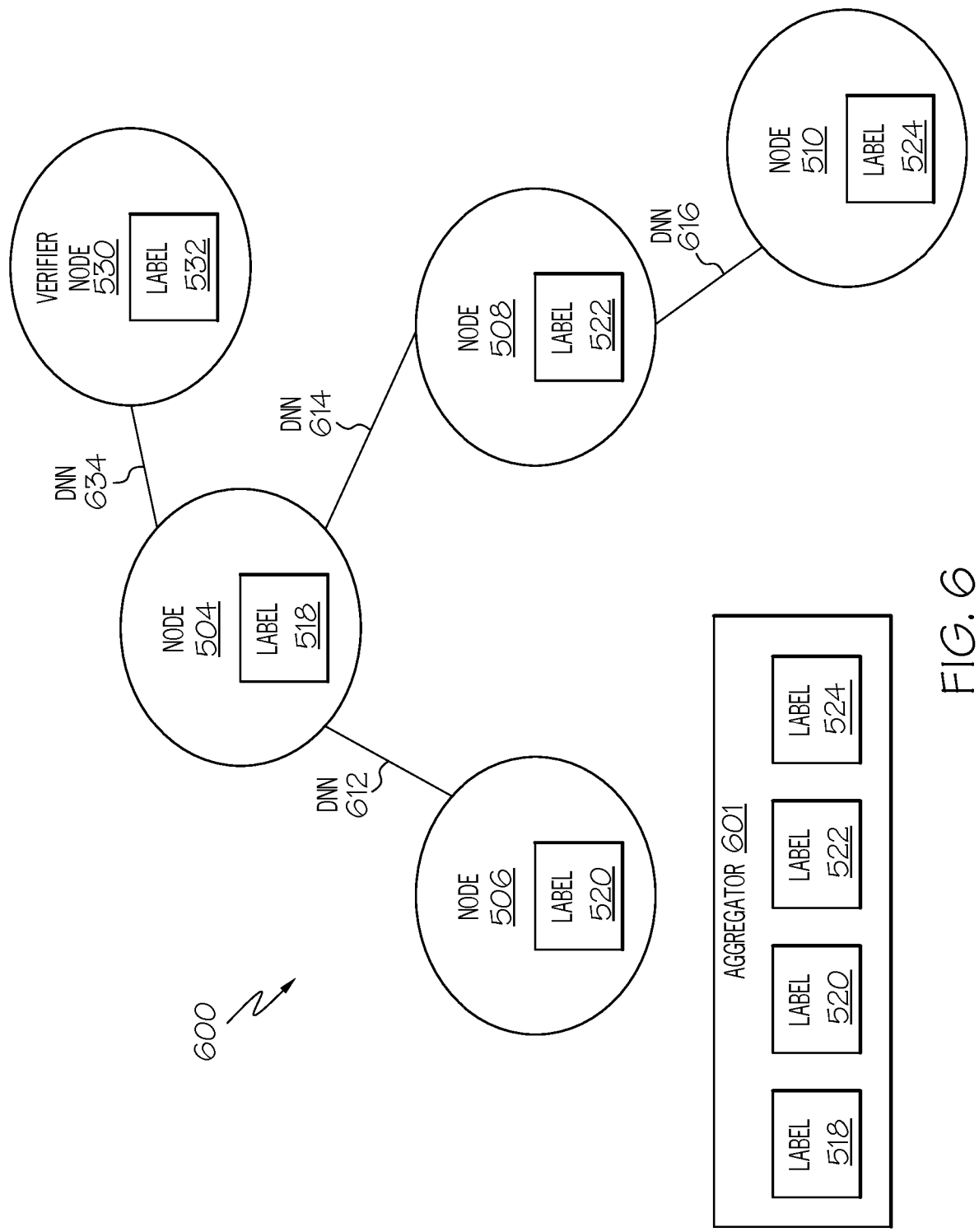
FIG. 6 illustrates an aggregation of labels in a GNN that utilizes deep neural networks (DNNs) in accordance with one or more embodiments of the present invention.

As described herein, each identity profile for each person whose identity record/profile is within a particular identity network has an associated graph neural network (see FIGS. 5-6). That is assume that Person A has an identity profile in both identity network 402 as well as identity network 408. Assume further that a graph neural network for each of these identity profiles has a same structure, but perhaps with different labels and/or attribute values. That is, graph neural network 414 and graph neural network 416 are both for Person A, and they both have a same nodal structure. If the aggregate label values (see below with reference to aggregator 601 in FIG. 6) for graph neural network 414 and graph neural network 416 are different, even though they have the same structure and are supposed to both be for the same Person A, then one or both of these identity records/profiles for Person A are deemed to be not similar, and thus potentially fraudulent.

In an embodiment of the present invention, an identity broker 418 receives requests from identity requesters 420, which are fulfilled by the identity broker 418 from identity profiles from various identity networks (e.g., identity network 402 and identity network 408) and the analysis thereof, as described herein.

An identity requester 420 is an entity that is requesting either an identity record for a particular person, or else an authentication of a provided identity record for a particular person. For example, assume that identity requester 420 is a bank, and "Person A" is applying for a loan. This bank can request that a valid/trusted identity record for "Person A" be provided by the identity broker 418, such that the bank can be certain that "Person A" is who he/she says he/she is. Alternatively, the bank can provide an identity record (e.g., a record that includes the name, address, social security number, employment history, etc.) for "Person A" to the identity broker 418, which will then determine if a similar (contains more than a predetermined matching attributes and less than a predetermined contradictory attributes) identity record exists. If so, then the identity record for "Person A" is verified as being accurate/trustworthy.

With reference now to FIG. 5, addition detail of the identity profiles depicted in FIG. 4 is shown in an embodiment of the present invention as a graph neural network 500.

Graph neural network 500 is a collection of nodes, each of which have a label, that are connected by edges.

For example, assume that node 504 includes the label 518 of "Name". Node 506, node 508, and node 510 are attributes of the entity identified by label 518. For example, node 506 could be for the attribute "occupation", and could have the label 520 of "teacher". Edge 512 includes a description of node 506 and its relationship to node 504. Node 508, logically connected by edge 514 to node 504, could be for the attribute "street address", and could have the label 522 of "123 Main Street". Node 510, logically connected to node 508 by edge 516, could be for the attribute "city address", and could have the label 524 of "Anywhere, USA".

As stated in the description of graph neural network 500, the edges 512, 514, and 516 provide a logical relationship between their respective nodes. As such, the connections provided by edges 512, 514, 516 between nodes 504, 506, 508, and 524 create the graph neural network 500.

In an embodiment of the present invention, the graph neural network 500 includes a verifier node 530, which verifies that the information in the graph neural network 500 came from a certain provider. For example, assume that graph neural network 500 is for Person A. The verifier node 530 includes a label 532, which identifies "Company X" as the source of identity information about Person A. In an embodiment of the present invention, however, the validity/accuracy of the attributes and their labels/values is not guaranteed. Rather, the verifier node 530 merely verifies that the attributes and their labels/values are provided by Company X. Whether or not the information in the attributes/nodes/labels has been verified is described in edge 534. As shown in FIG. 6, if edge 534 is actually a deep neural network 634, then this deep neural network 634 is trained to determine if the attributes/nodes/labels are accurate, and to report their accuracy/trustworthiness to the node 504.

Thus, in the related graph neural network 600 shown in FIG. 6, the logical relationship provided by edges 512, 514, and 516 in the graph neural network 500 shown in FIG. 5 is established by neural networks. That is, the nodes 504, 506, 508, and 510 and the labels 518, 520, 522, and 524 remain the same, but edges 512, 514, 516 are deep neural networks 612, 614, 616.

More specifically, the logical relationships between the nodes in the graph neural network 600 are established by deep neural networks.

Figure 7:
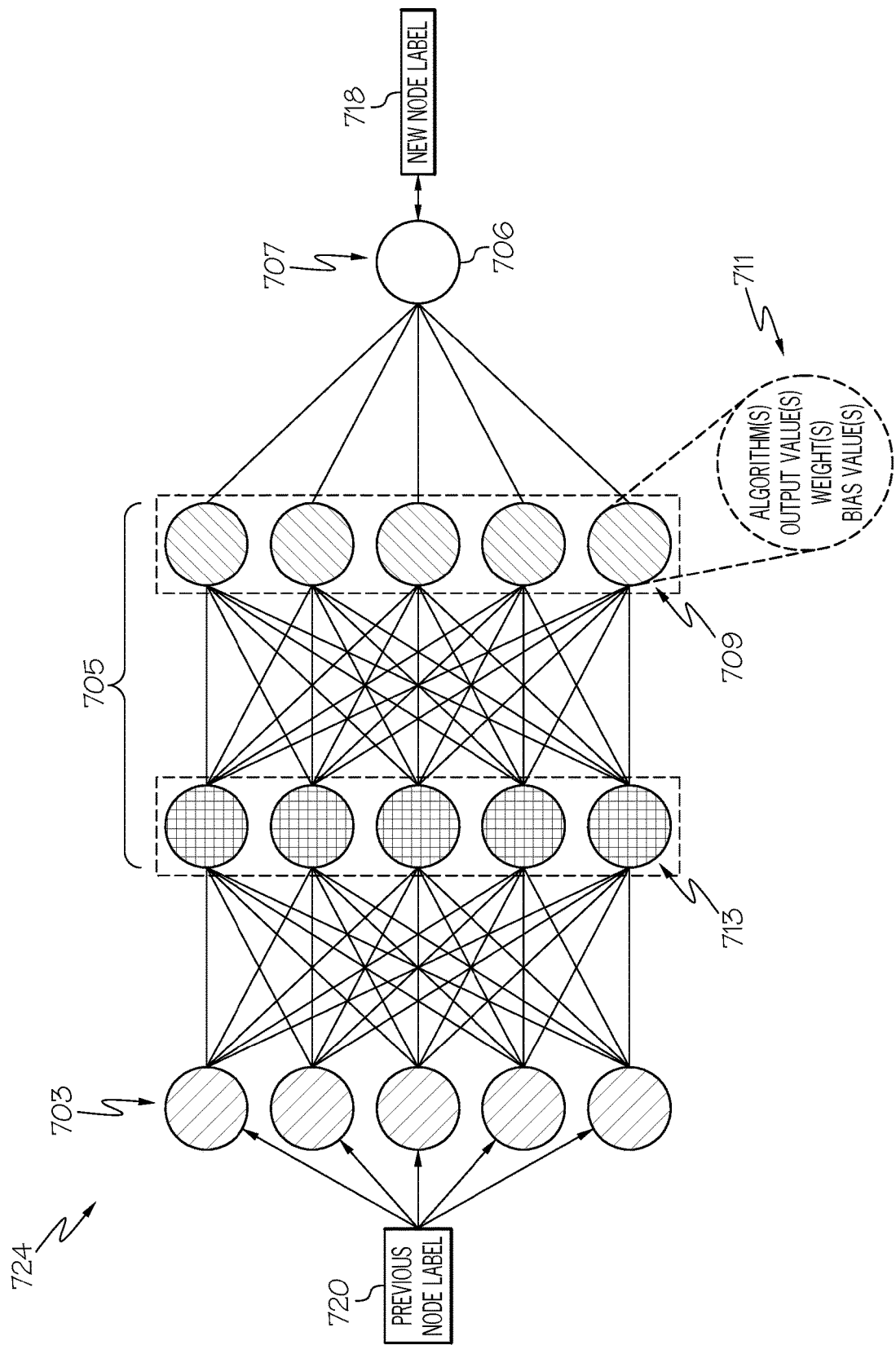
FIG. 7. depicts an exemplary DNN as used in one or more embodiments of the present invention.

For example, consider deep neural network 724 (analogous to machine learning system 124 shown in FIG. 1 and/or deep neural network (DNN) 612 shown in FIG. 6), as depicted in FIG. 7.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are only "excitatory" to varying degrees.

In a Deep Neural Network (DNN), electronic neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often a single node for holding vector information.

With reference now to FIG. 7, a Deep Neural Network (DNN) 724 (analogous to machine learning system 124 shown in FIG. 1 and/or DNN 612, DNN 614, and/or DNN 616 shown in FIG. 6) used to evaluate data in one or more embodiments of the present invention is presented. As described herein, DNN 724 is able to discern the logical relationships between nodes in a graph neural network, such as graph neural network 600 shown in FIG. 6.

For example, assume that label 520 includes a suffix that suggests a label for an occupation of the person named in node 504 in FIG. 6. That is, a suffix in label 520 of "er" (e.g., "teacher" or "engineer"), "ist" (e.g., "physicist"), "ian" (e.g., "physician"), etc. is used by a trained deep neural network to recognize this label 520 as a name of an occupation, which thus defines the edge between node 504 and node 506 in FIG. 6.

As shown in FIG. 7, assume that previous node label 720 (analogous to the content of label 520 in FIG. 6) is data that describes a particular occupation. Assume further that the DNN 724 is trained to output a new node label 718 (analogous to the content of label 518 in FIG. 6), thus indicating that there is a logical relationship (e.g., edge 512 shown in FIG. 5) between node 506 and node 504, in which node 506 describes an occupation of the person identified in node 504.

The electronic neurons (also referred to herein simply as "neurons" or "nodes") in DNN 724 are arranged in layers, known as an input layer 703, hidden layers 705, and an output layer 707. The input layer 703 includes neurons/nodes that take input data, and send it to a series of hidden layers of neurons (e.g., hidden layers 705), in which neurons from one layer in the hidden layers are interconnected with all neurons in a next layer in the hidden layers 705. The final layer in the hidden layers 705 then outputs a computational result to the output layer 707, which is often a single node for holding vector information. In an embodiment of the present invention, the output neuron 706 is associated with a particular node label from the graph neural network 600 shown in FIG. 6, such as label 518 in FIG. 6 (shown as new node label 718 in FIG. 7).

As just mentioned, each node in the depicted DNN 724 represents an electronic neuron, such as the depicted neuron 709. As shown in block 711, each neuron (including neuron 709) functionally includes at least four features: an algorithm, an output value, a weight, and a bias value.

The algorithm is a mathematical formula (e.g., mathematical function) for processing data from one or more upstream neurons. For example, assume that one or more of the neurons depicted in the middle hidden layers 705 send data values to neuron 709. Neuron 709 then processes these data values by executing the algorithm shown in block 711, in order to create one or more output values, which are then sent to another neuron, such as another neuron within the hidden layers 705 or a neuron in the output layer 707. Each neuron also has a weight that is specific for that neuron and/or for other connected neurons. Furthermore, the output value(s) are added to bias value(s), which increase or decrease the output value, allowing the DNN 724 to be further "fine-tuned".

For example, assume that neuron 713 is sending the results of its analysis of a piece of data to neuron 709. Neuron 709 has a first weight that defines how important data coming specifically from neuron 713 is. If the data is important, then data coming from neuron 713 is weighted heavily, and/or increased by the bias value, thus causing the mathematical function (s) within neuron 709 to generate a higher output, which will have a heavier impact on neurons in the output layer 707. Similarly, if neuron 713 has been determined to be significant to the operations of neuron 709, then the weight in neuron 713 will be increased, such that neuron 709 receives a higher value for the output of the mathematical function in the neuron 713. Alternatively, the output of neuron 709 can be minimized by decreasing the weight and/or bias used to affect the output of neuron 709. These weights/biases are adjustable for one, some, or all of the neurons in the DNN 724, such that a reliable output will result from output layer 707. In one or more embodiments of the present invention, finding the values of weights and bias values is done automatically by training the neural network. In one or more embodiments of the present invention, manual adjustments are applied to tune the hyperparameters such as a learning rate, dropout rate, regularization factor and so on. As such, training a neural network involves running forward propagation and backward propagation on multiple data sets until the optimal weights and bias values are achieved to minimize a loss function. The loss function measures the difference in the predicted values by the neural network and the actual labels for the different inputs.

When manually adjusted, the weights are adjusted by the user, sensor logic, etc. in a repeated manner until the output from output layer 707 matches expectations. For example, assume that input layer 703 receives inputs that describe a particular graph neural network node/label. In an exemplary input, the input to input layer 703 contains values that describe a certain occupation (e.g., "teacher"). If DNN 724 has been properly trained (by adjusting the mathematical function (s), output value(s), weight(s), and biases in one or more of the electronic neurons within DNN 724), then it will output a vector/value to output neuron 706 in the output layer 707, indicating that the output neuron 706 is associated with the new node label 718 for a name of a person.

When automatically adjusted, the weights (and/or mathematical function) are adjusted using "back propagation", in which weight values of the neurons are adjusted by using a "gradient descent" method that determines which direction each weight value should be adjusted to. This gradient descent process moves the weight in each neuron in a certain direction until the output from output layer 707 improves (e.g., accurately describes the relationship between two nodes in the graph neural network 600 shown in FIG. 6).

Returning to FIG. 6, in an embodiment of the graph neural network 600, the labels are eventually aggregated by computing logic known as an aggregator. That is, labels from proximate nodes (e.g., label 518 from node 504, label 520 from node 506, and label 522 from node 508) are aggregated using an aggregator 601, which is logic that identifies and aggregates labels. Thereafter, a second order aggregation occurs, which brings label 524 into the aggregation of labels 518, 520, and 522. This aggregation of labels 518, 520, 522, and 524 is a summation or other mathematical description (e.g., average, mean, etc.) that provides an overall label for the graph neural network 600. For example, assume that the respective values for labels 518, 520, 522, and 524 are 8, 2, 4, and 2. As such, if a summation is used, then the aggregated value for labels 518, 520, 522, and 524 is 16 (8+2+4+2=16).

Figure 8:
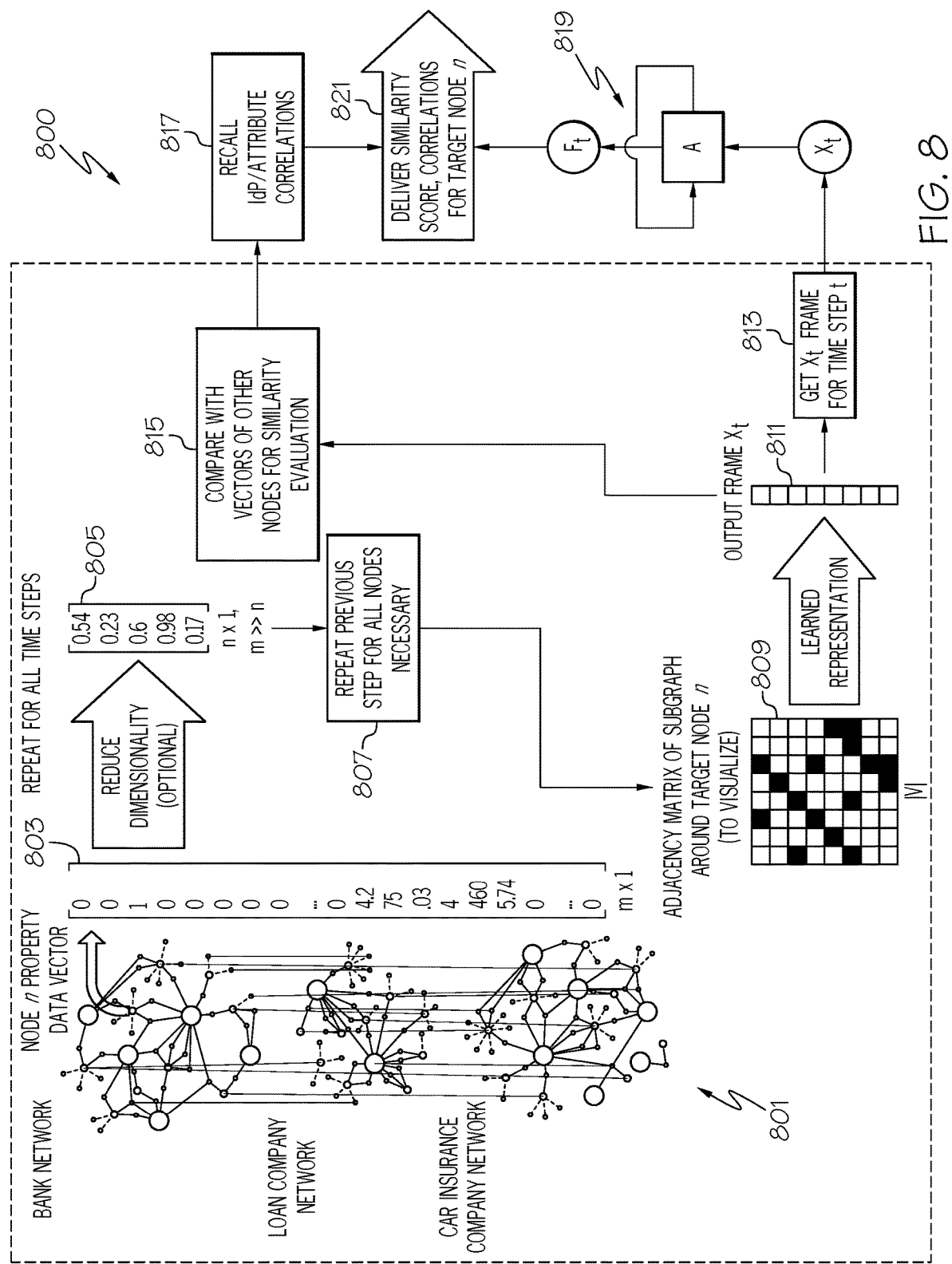
FIG. 8 depicts a high-level overview of a temporal-based embodiment of the present invention.

With reference now to FIG. 8, an exemplary temporal similarity evaluation model 800 as used in one or more embodiments of the present invention is presented.

Disparate networks 801 (analogous to identity network 402 and identity network 408 shown in FIG. 4) generate data vectors from the values of their identity graphs, in order to populate a vector 803. This vector 803 is reduced into a manageably sized reduced vector 805, which is repeated until all (or a predefined number) of the nodes in the graphs in the disparate networks 801 are polled for their values. The reduced vector 805 is then used (block 807) to create a matrix subgraph 809, which is used to create an output frame 811 (e.g., a hashed version of the rows in the matrix subgraph 809). As shown in block 813, the output frame 811 is sent out as a frame at a current time step t (block 813), which is used as an input to an accumulator A and analysis function Ft (element 819), which sends its output to a similarity score output 821. Also input by the system to create the similarity score output 821 are identity profile/attribute correlations 817, which are based on the output of node correlations shown in block 815.

Figure 9:
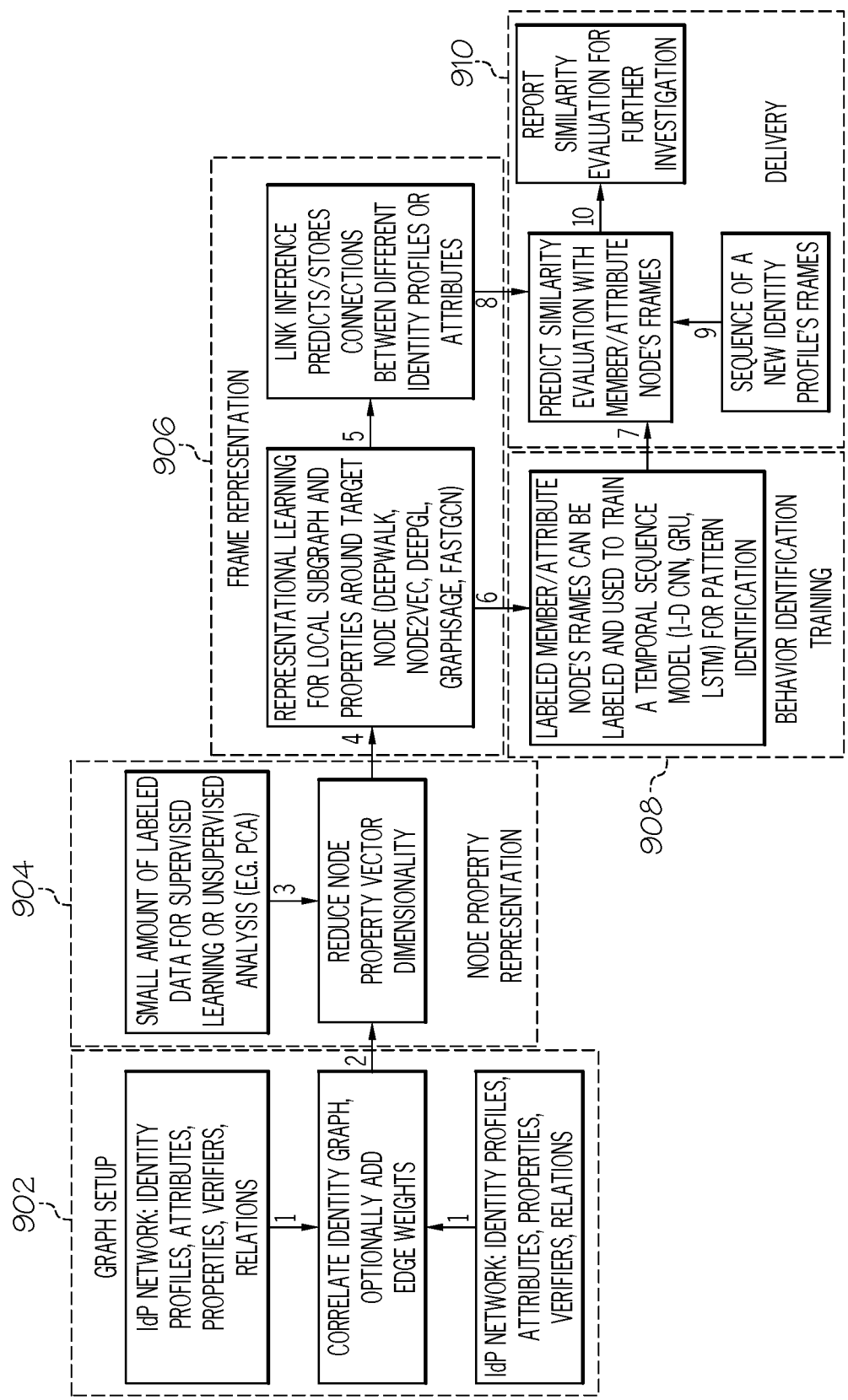
FIG. 9 illustrates a high-level overview of one or more embodiments of the present invention.

With reference to FIG. 9, another overview 900 of one or more embodiments of the present invention is presented.

That is, one or more embodiments of the present invention includes (logic for) a graph setup 902, a node property representation 904, a frame representation 906, behavior identification training 908, and an identity and/or similarity score delivery 910.

The graph setup 902 formats and correlates/aggregates available data from networks for consumption by a node representation system such as the graph neural network 600 shown in FIG. 6.

As such, the graph setup 902 assigns all sources a class based on their network and type; aggregates/merges correlated Identity profile/attribute vertices; creates vectors for vertex property representation; and (optionally) defines a hierarchy of verifier-type/attribute pairings (verifier trust lattice). In order to achieve this graph setup 902, inputs to the system include, for each network, a set composed of vectors for known fraudulent identity profiles ($V_{IdP\_fraudulent}$); vectors for known non-fraudulent identity profiles ($V_{IdP\_non-fraudulent}$); vectors that describe a verifier (e.g., described as verifier node 530 in FIG. 5) of each identity profile ($V_{verifier}$); a vector describing the attribute types ($\{V_{attr\_of\_type}|attr\_of\_type \in attr\_types\}$), such as those described by the labels shown in FIG. 5); a verification of the identity profiles ($E_{verification}$) and their ownership ($E_{ownership}$); metadata (properties) for each vertex; and cross-network identity profile/asset correlations (using an aggregation system like an identity broker that connects an identity profile/attribute in one network to one in another). This results in an output of an identity graph $G=(V_{aggregated}, E_{aggregated})$; Vertices→nodes, which are represented by identifier and sparse vectors for classification/properties; and edges that are represented as a pair of node identifiers.

The node property representation 904 creates dense representations of node properties for downstream local feature learning, in order to improve runtime. In order to achieve the node property representation 904, the system uses sparse node property vectors and labels as inputs, in order to output a dense, low-dimensional representation of vectors for each node, thus creating an identity graph with representation vectors depicting identity attribute data.

The frame representation 906 creates dense, continuous feature representations for nodes in the identity graphs. The frame representation 906 is performed by the system using nodes from an identity graph and their respective edges as inputs, and outputs dense, continuous, low-dimensional embeddings for nodes in context, called "frames", which are used to link predictions of similarities in identity profiles to represent possibly unreported correlated identity profiles, abnormalities in attribute relations, etc.

Behavior identification training 908 trains a sequence model to identify similar behaviors indicated in labeled sequences of frames. The behavior identity training 908 uses triplets of embeddings or sequences of embeddings as an input to the system, thus allowing it to use a sequence model to predict output vector of the final cell. That is, the behavior identity training 908 outputs a trained sequence model for inference on a new pair of embeddings or sequences of embeddings.

The identity and/or similarity score delivery 910 trains a sequence model to identify similar behaviors indicated in labeled sequences of frames. The identity and/or similarity score delivery 910 uses a new sequence of frames for each attribute node owned by an identity profile in the identity graph, along with pre-calculated similarity scores of other attributes/identity profiles in graph as inputs, in order to create a deliverable similarity report (the output) based on relevant similarity information. For example, the system can run a sequence of frames through a trained sequence model, retrieve similarity score for each attribute, add similarity score for target attribute to deliverable; distinguish attribute similarity scores by network, and then add this to the similarity report; calculate an average similarity score of the overall identity profile, add this to similarity report; and/or bundle other useful related metrics for further investigation by client, then add this to similarity report.

Thus, as represented in FIG. 9, and as shown in step 1, attribute types, identity profiles, verifiers, properties, and edges are correlated into an identity graph, in which identity profiles are linked together/correlated by an identity broker, self-reporting, ID matching, inference, etc.

As shown in step 2, the system parses node definitions, property vectors, and edges, and sends them to the node property representation 904, which also incorporates labels for the nodes in the graphs, as shown in step 3.

As shown in step 4, the node property representation 904 provides a dense node definition and property vectors to the frame representation 906, which (in step 5) generates a correlated identity graph with identical structure but lower-dimensional node representations.

As shown in step 6, the frame representation 906 sends member or attribute node "frames" (latent representations of local topology and properties) to the behavior identification training 908, which outputs (step 7) sequence model weights used to predict similarity scores (also using the mapping of highly similar profiles for correlation shown in step 8), as well as a sequence of member or attribute frames (step 9). As shown in step 10, a final similarity score with linked identity profiles is then output to a requester of an identity for a particular person.

Figure 10:
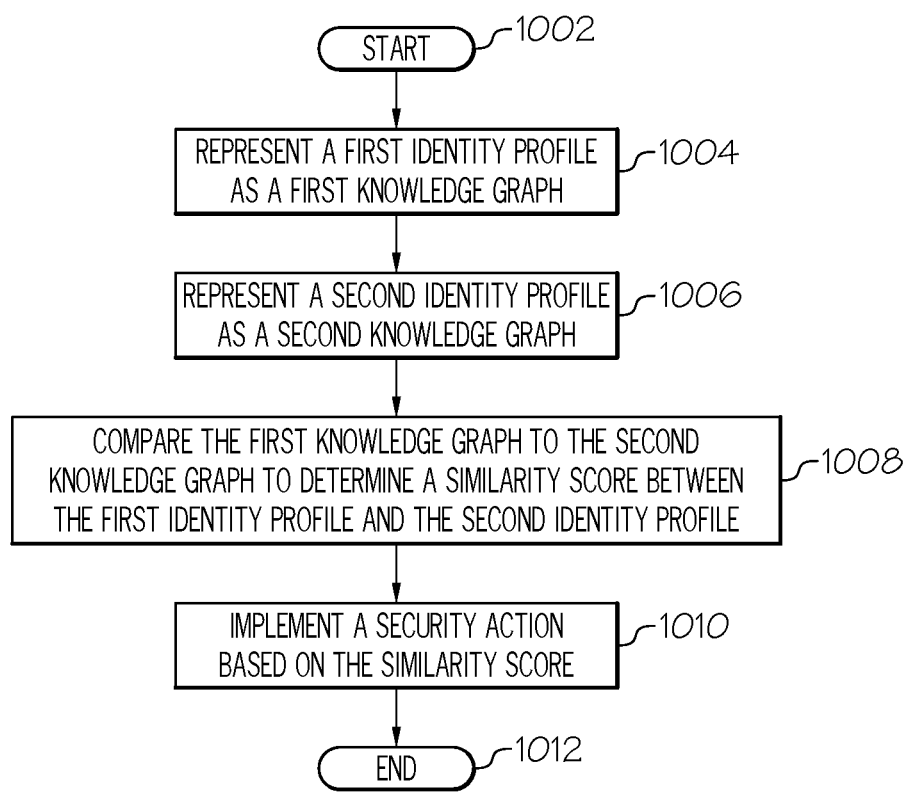
FIG. 10 is a high-level flow chart of one or more steps performed in accordance with one or more embodiments of the present invention.

With reference now to FIG. 10, a high-level flow chart of one or more elements of an exemplary method performed by the present invention is presented.

After initiator block 1002, one or more processors (e.g., with identity broker 418 shown in FIG. 4), represents a first identity profile as a first identity graph (e.g., identity graph 204 from FIG. 2, which in one or more embodiments is represented as a graph neural network such as that depicted in FIG. 5 and/or FIG. 6), as depicted in block 1004.

As described in block 1006 in FIG. 10, the processor(s) represents a second identity profile as a second identity graph (e.g., identity graph 206 from FIG. 2, which in one or more embodiments is represented as a graph neural network such as that depicted in FIG. 5 and/or FIG. 6).

As described in block 1008, the processor(s) then compare the first identity graph to the second identity graph to determine a similarity score between the first identity profile and the second identity profile. Thus, this comparison creates a similarity score across multiple profiles.

As described in block 1010, the processor(s) then implement a security action based on the similarity score.

The flow chart ends at terminator block 1012.

In an embodiment of the present invention, the first identity graph and the second identity graph are graph neural networks (see FIG. 5 and FIG. 6).

In an embodiment of the present invention, the first identity graph is from a first identity network (e.g., identity network 202 in FIG. 2), and the second identity graph is from a second identity network (e.g., identity network 208 in FIG. 2). As such, the first identity graph and the second identity graph are decentralized identity graphs.

In an embodiment of the present invention, in which each node in the identity graph is represented as a node vector, the method further comprises: representing, by one or more processors, a neighborhood of the each node as a neighborhood vector, where similarities to the identity profile are determined by detecting similarities in the neighborhood vector; and determining, by one or more processors, that the identity profile is legitimate based on the detected similarities in the neighborhood vector being more than a predetermined quantity.

That is, as described in FIG. 2, node 218 and node 220 are represented by neighborhood vectors. Furthermore, node 218 and node 220 are neighbors of node 212 and node 220 respectively, since they describe the same type of data defined as "address". As such, since the data vectors from nodes 212 and 216 are the same, then the identity graphs 204 and 206 are deemed to be legitimate, since they are highly similar.

In an embodiment of the present invention, in which the similarity score is less than a predefined value, the security action is blocking a release of the identity profile to a requester of the identity profile in response to the similarity score being less than the predefined value. That is, if a requested identity profile from identity profiles 404 shown in FIG. 4 has no other identity profile that is close enough to another identity profile for a particular entity, then the identity broker 418 will deny the request from the identity requester 420 for that identity profile.

As described in FIG. 7, in an embodiment of the present invention the processor(s) link a first node and a second node in the first identity graph with a deep neural network; and then predict a content of a first second node based on an input from the first node to the deep neural network. That is, the output of the deep neural network 724 shown in FIG. 7 predicts what the new node label 718 for the second node will be, based on the label of the first node, as described by previous node label 720.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
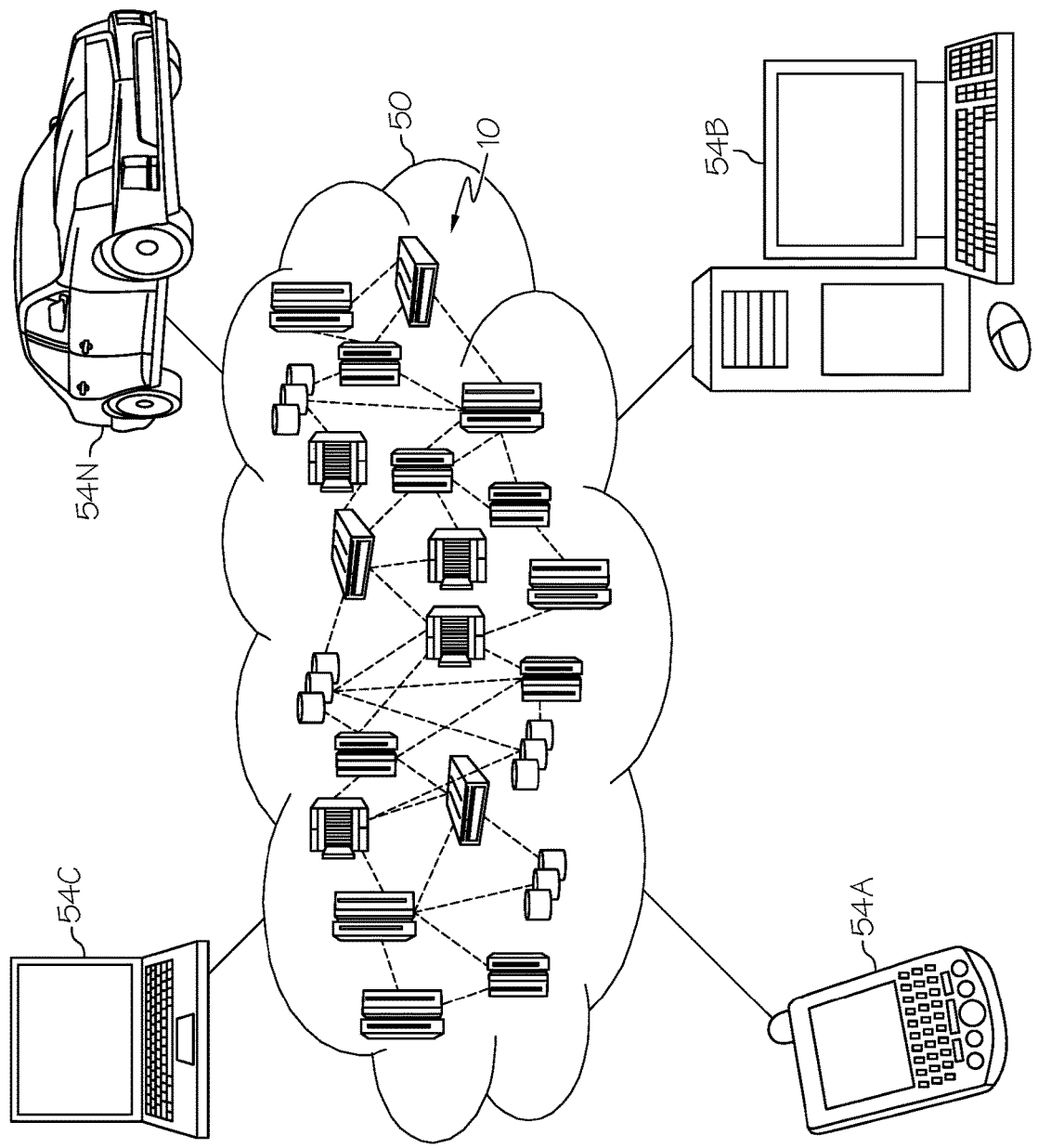
FIG. 11 depicts a cloud computing environment according to an embodiment of the present invention.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 11 are intended to be illustrative only and that computing nodes 10 and cloud computing environment 50 can communicate with any type of computerized device over any type of network and/or network addressable connection (e.g., using a web browser).

Figure 12:
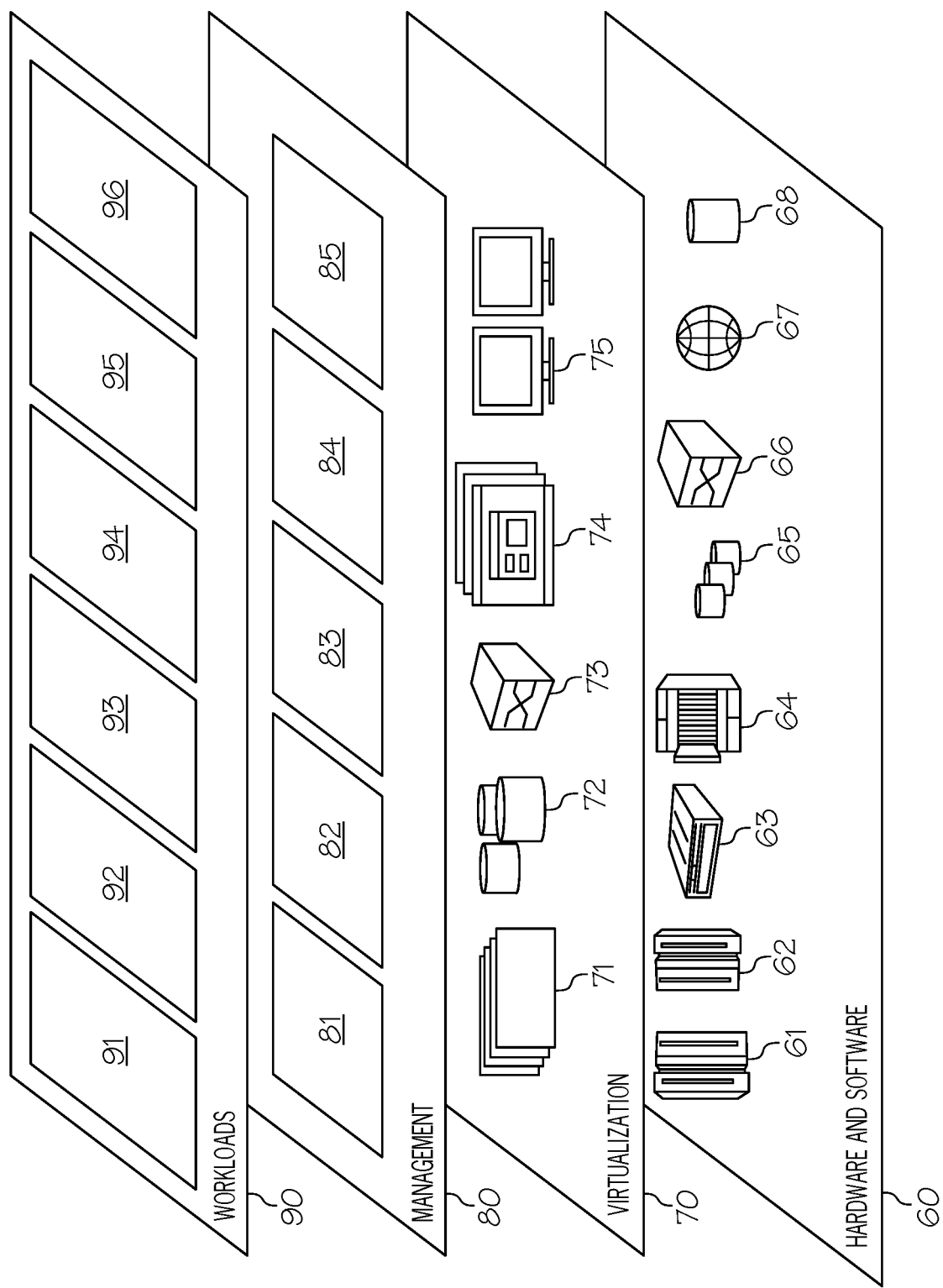
FIG. 12 depicts abstraction model layers of a cloud computer environment according to an embodiment of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and machine learning and identity similarity detection processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
   representing a first identity profile from a first network as a first identity graph;
   representing a second identity profile from a second network as a second identity graph, wherein the first identity profile and the second identity profile are decentralized identity profiles, wherein the first identity graph and the second identity graph are decentralized identity graphs;
   representing a first neighborhood of nodes of the first identity graph as a first neighborhood vector and a second neighborhood of nodes of the second identity graph as a second neighborhood vector;
   performing a contrastive loss analysis of the first identity graph to the second identity graph to describe similarities in the first and second neighborhood vectors;
   determining a similarity score between the first identity profile and the second identity profile based on the similarities of the first and second identity graphs, wherein the similarity score is across multiple identity profiles represented in the decentralized identity graphs; and
   implementing a security action based on the similarity score.

2. The method of claim 1, wherein the first identity graph and the second identity graph are graph neural networks.

3. The method of claim 1, further comprising:
   determining that the second identity profile is legitimate based on the similarity score being more than a predetermined value.

4. The method of claim 1, wherein:
   the similarity score is less than a predefined value, and
   the security action is blocking a release of the identity profile to a requester of the identity profile in response to the similarity score being less than the predefined value.

5. The method of claim 1, further comprising:
   linking a first node and a second node in the first identity graph with a deep neural network; and
   predicting a content of the second node based on an input from the first node to the deep neural network.

6. A computer program product comprising a computer readable storage medium having program code embodied therewith, wherein the computer readable storage medium is not a transitory signal per se, and wherein the program code is readable and executable by a processor to perform a method comprising:
   representing a first identity profile from a first network as a first identity graph;
   representing a second identity profile from a second network as a second identity graph, wherein the first identity profile and the second identity profile are decentralized identity profiles, wherein the first identity graph and the second identity graph are decentralized identity graphs;
   representing a first neighborhood of nodes of the first identity graph as a first neighborhood vector and a second neighborhood of nodes of the second identity graph as a second neighborhood vector;
   performing a contrastive loss analysis of the first identity graph to the second identity graph to describe similarities in the first and second neighborhood vectors;
   determining a similarity score between the first identity profile and the second identity profile based on the similarities of the first and second identity graphs, wherein the similarity score is across multiple identity profiles represented in the decentralized identity graphs; and
   implementing a security action based on the similarity score.

7. The computer program product of claim 6, wherein the first identity graph and the second identity graph are graph neural networks.

8. The computer program product of claim 6, the method further comprising:
   determining that the second identity profile is legitimate based on the similarity score being more than a predetermined value.

9. The computer program product of claim 6, wherein:
   the similarity score is less than a predefined value, and
   the security action is blocking a release of the identity profile to a requester of the identity profile in response to the similarity score being less than the predefined value.

10. The computer program product of claim 6, wherein the method further comprises:
    linking a first node and a second node in the first identity graph with a deep neural network; and
    predicting a content of the second node based on an input from the first node to the deep neural network.

11. The computer program product of claim 6, wherein the program code is provided as a service in a cloud environment.

12. A computer system comprising:
one or more processors, and
a computer readable storage medium,
wherein:
the one or more processors are structured, located, connected, and/or programmed to run program instructions stored on the computer readable storage medium; and
the program instructions which, when executed by the one or more processors, cause the one or more processors to perform a method comprising:
  representing a first identity profile from a first network as a first identity graph;
  representing a second identity profile from a second network as a second identity graph, wherein the first identity profile and the second identity profile are decentralized identity profiles, wherein the first identity graph and the second identity graph are decentralized identity graphs;
  representing a first neighborhood of nodes of the first identity graph as a first neighborhood vector and a second neighborhood of nodes of the second identity graph as a second neighborhood vector;
  performing a contrastive loss analysis of the first identity graph to the second identity graph to describe similarities in the first and second neighborhood vectors;
  determining a similarity score between the first identity profile and the second identity profile based on the similarities of the first and second identity graphs, wherein the similarity score is across multiple identity profiles represented in the decentralized identity graphs; and
  implementing a security action based on the similarity score.

13. The computer system of claim 12, wherein the first identity graph and the second identity graph are graph neural networks.

14. The computer system of claim 12, the method further comprising:
  determining that the second identity profile is legitimate based on the similarity score being more than a predetermined value.

15. The computer system of claim 12, wherein:
  the similarity score is less than a predefined value, and
  the security action is blocking a release of the identity profile to a requester of the identity profile in response to the similarity score being less than the predefined value.

16. The computer system of claim 12, wherein the method further comprises:
  linking a first node and a second node in the first identity graph with a deep neural network; and
  predicting a content of the second node based on an input from the first node to the deep neural network.

17. The computer system of claim 12, wherein the stored program instructions are provided as a service in a cloud environment.

* * * * *